United States Patent
Sethi et al.

(10) Patent No.: US 8,156,478 B2
(45) Date of Patent: Apr. 10, 2012

(54) OPTIMIZED PROGRAM ANALYSIS

(75) Inventors: Ajay Sethi, Bangalore (IN); Sameer Shisodia, Bangalore (IN); Mahantesh Hosmath, Dharwad (IN); Ritesh Motlani, Madhya Pradesh (IN); Ramesh Bhattiprolu, Bangalore (IN); Kirk Bradley, San Francisco, CA (US); John Pullokkaran, Foster City, CA (US); Sunil Kumar, Foster City, CA (US); Gopalaswamy Ramesh, Chennai (IN)

(73) Assignee: Oracle International Corporation, Redwood Shores, CA (US)

( * ) Notice: Subject to any disclaimer, the term of this patent is extended or adjusted under 35 U.S.C. 154(b) by 1347 days.

(21) Appl. No.: 11/508,576

(22) Filed: Aug. 22, 2006

(65) Prior Publication Data
US 2007/0006164 A1   Jan. 4, 2007

Related U.S. Application Data

(62) Division of application No. 10/443,316, filed on May 21, 2003, now abandoned.

(60) Provisional application No. 60/384,206, filed on May 29, 2002.

(51) Int. Cl.
*G06F 9/44* (2006.01)
*G06F 11/00* (2006.01)

(52) U.S. Cl. ............... 717/131; 714/38.11; 717/124; 717/128

(58) Field of Classification Search .............. 717/124, 717/128, 131; 714/38.11
See application file for complete search history.

(56) References Cited

U.S. PATENT DOCUMENTS

| 5,560,009 A * | 9/1996 | Lenkov et al. | 717/124 |
| 6,163,858 A * | 12/2000 | Bodamer | 714/34 |
| 6,226,761 B1 * | 5/2001 | Berstis | 714/37 |
| 6,601,188 B1 * | 7/2003 | Wilding | 714/15 |
| 6,678,883 B1 * | 1/2004 | Berry et al. | 717/128 |
| 6,681,348 B1 * | 1/2004 | Vachon | 714/45 |
| 6,795,963 B1 * | 9/2004 | Andersen et al. | 717/130 |
| 2005/0050389 A1 * | 3/2005 | Chaurasia | 714/15 |

OTHER PUBLICATIONS

Litzkow et al. (Supporting Checkpointing and Process Migration Outside the UNIX Kernel, In Proc. of the Winter 1992 USENIX, pp. 283-290, Jan. 1992).*
Oracle, "Oracle 9i Database Error Message", Oracle Corporation, pp. i-xxiv, Chapter 1, pp. 1-6, Chapter 50, pp. 1-78, Chapter 51, pp. 1-22, Chapter 52, pp. 1-16, Mar. 2002.

* cited by examiner

*Primary Examiner* — Li Zhen
*Assistant Examiner* — Hang Pan
(74) *Attorney, Agent, or Firm* — Hickman Palermo Truong & Becker LLP (57) ABSTRACT

The present invention generally relates to computer software, and more specifically, to a computerized utility for analysis of optimized program files. A method and apparatus for optimized program analysis is disclosed.

20 Claims, 4 Drawing Sheets

OPTIMIZED PROGRAM ANALYSIS

PRIORITY CLAIM AND RELATED APPLICATION

This application claims priority to U.S. provisional application Ser. No. 60/384,206, entitled "Platform Independent Core Dump Analysis," filed May 29, 2002, naming as inventor Ajay Sethi, the entire disclosure of which is hereby incorporated by reference for all purposes as if fully set forth herein. This application is a divisional application of patent application Ser. No. 10/443,316, filed May 21, 2003 now abandoned. This application is also related to U.S. patent application Ser. No. 10/443,311, entitled "Representation of Core Files in a Generic Format," filed on May 21, 2003, naming as inventors Ajay Sethi, Sameer Shisodia, Mahantesh Hosmath, Ritesh Motlani, Ramesh Bhattiprolu, Kirk Bradley, John Pullokkaran, Sunil Kumar, and Gopalaswamy Ramesh, the entire disclosure of which is hereby incorporated by reference for all purposes as if fully set forth herein.

FIELD OF THE INVENTION

The present invention generally relates to computer software, and more specifically, to a computerized utility for debugging software.

BACKGROUND OF THE INVENTION

Unless otherwise indicated, the approaches described in this section are not prior art to the claims in this application and are not admitted to be prior art by inclusion in this section.

When developing program code for multiple computer operating systems, the program code is generic except for specific layers performing platform-dependent tasks. Generic program code should compile and run on all platforms. A core file is typically generated by the operating system when a process fails because of an irrecoverable error. Information obtained from this core file serves as a starting point for determining and analyzing what contributed to the failure.

Commercially available software programs are often shipped in an optimized format, without symbol and type information. In conventional debugging and analysis techniques, lack of this information can necessitate running a process multiple times. Rebuilding unoptimized code is extremely inefficient for software programs with a large source base. When it is not readily apparent how much of the code needs rebuilding, it is impractical to rebuild the code in its entirety because of the size of the resulting binary.

To circumvent this limitation, engineers manually inspect source code while running optimized executables, trying to pinpoint areas that could have contributed to the error. To debug code, engineers typically rebuild the suspect portion of the code unoptimized, run it in a debugging environment on the same platform where the error occurred, and attempt to replicate the error. Time and inaccuracy are major drawbacks to this conventional debugging and analysis technique. In addition, the unoptimized code may not behave consistently with the optimized code because the behavior of the executable may be different, and therefore, the error may not be reproducible.

Support and development teams typically perform debugging in tandem. Platforms at client, development, and support sites may well vary, and core file formats vary from platform to platform. Additionally, byte ordering of data differs depending on machine architecture. There are many limitations to conventional debugging and analysis techniques.

For example, in most collaborative support and development environments, support teams are the first to receive and analyze core files generated by a software crash at a client site. Generally, development and support work together to troubleshoot and resolve code errors. One benefit of collaborative environments is that individuals are able to contribute to areas of the code in which they have expertise. However, a drawback to traditional techniques is that collaborative environments often include multiple platforms, operating system versions, and environments. Traditional techniques can require support and development personnel to repeat steps in their separate environments. Both time and effort would be saved if developers and support analysts were able to contribute to editing and building code without duplicating effort. Incremental and persistent capture and storage of analysis and debugging data would save additional time and effort.

In addition, when platforms at client and development sites are different, replicating bugs may be difficult or even impossible. Conventional debuggers require a compiled binary for each platform. A drawback to traditional techniques is that even with platform-specific layers, there may be bugs on a specific platform that will not replicate on another platform. Traditional techniques require that the developer would have to replicate, change, test, and debug the code on both deployment and development environments. This approach requires that the developer be familiar with tools, debuggers and other support software on both platforms. If the developer could analyze the code in a generic format on any platform, time and effort would be saved.

Based on the foregoing, it is desirable to provide techniques for analysis of optimized code in a generic format wherein the optimized code can be analyzed to help in determining errors in code that occurred that the operating system is unable to handle. Additionally, it is desirable to analyze code using existing core dumps from existing optimized binaries.

SUMMARY OF THE INVENTION

When developing code for multiple platforms, traditionally, a majority of the code is generic except for the platform specific layers. Ideally, the generic code should compile and run as is on all platforms. The platform-specific layers are added for tasks which need platform specific implementations, and work differently across platforms. Because of the variations in core file formats, traditional techniques make it impossible to transparently analyze core files from one platform another.

Techniques are provided for analysis of optimized program files. According to one aspect, a mechanism for analysis of core files in a platform independent manner is provided. According to another aspect, a method of analysis and interpretation of converted data from existing optimized executables, source files, and core files is provided. The converted data can be created in a generic format, such as the generic core format (GCORE) according to the techniques as described in patent application Ser. No. 10/443,311, entitled "Representation of Core Files in a Generic Format," filed on May 21, 2003. Converted data, henceforth referenced as a GCORE, can be analyzed and interpreted according to the techniques described herein.

Other objects and advantages will become readily apparent from the following detailed description. The invention can be embodied in different ways, and its details varied without departing from the invention. Accordingly, the drawings and descriptions are to be regarded as illustrative in nature, and not as restrictive.

BRIEF DESCRIPTION OF THE DRAWINGS

The present invention is depicted by way of example, and not by way of limitation, in the figures of the accompanying drawings and in which like reference numerals refer to similar elements and in which.

DETAILED DESCRIPTION OF THE PREFERRED EMBODIMENTS

A method and apparatus for analysis of optimized program files is herein described. Specific details are set forth to provide a thorough understanding of the present invention. It will be apparent, however, that the present invention may be practiced without these details. In other instances, well-known structures and devices are depicted in block diagram format to avoid unnecessarily obscuring the present invention.

GCORE: The Generic Core

A generic representation of core files and executables, or GCORE as it is henceforth referenced, contains information about core files and executables. According to an embodiment, GCORE includes a superset of binary formats used within UNIX. Examples include: the Executable and Linking Format (ELF), the Common Object File Format (COFF), the Programmable Instruction Set Computers Format (PRISC), and the Mobilization Stationing, Planning, and Execution System Format (MSPES). This superset of binary formats can be extended to support a multitude of binary formats. Since GCORE captures different segments across a multitude of binary formats, GCORE overcomes the debugging requirement of having a compiled binary for each platform. The code base for GCORE is generic therefore analysis can be performed on any platform. According to an embodiment, analysis of the GCORE can be done according to the techniques described herein.

Optimized Program Analysis

In the analysis of a core file, it is often difficult to ascertain what caused an executable to fail. Most data required for meaningful analysis of the core file exist in the core file's data sections. This data exists in raw binary format. Interpreting this data as such is not possible because symbol information is not available. In optimized executables, symbol information is stripped and therefore is not available. Debugging core dumps produced by executables on many operating systems involves determining the state of a process at the time of core dump. The state of a process at the time of a core dump comprises information such as the following:

The function call stack and parameters of the called function.

The values of local and global variables in the executable.
Contents of registers
Signal state at point of failure Of the above, in optimized executables, it is often not possible to get the parameters of the function calls and the values of the variables, whether local or global. This necessitates recompiling the code unoptimized and reproducing the problem to produce a core dump. However, in the real world, this can cause few problems:

Unoptimized executables do not always behave exactly like optimized ones.

The problem may be difficult to reproduce consistently.

For larger executables, it may be difficult to isolate errors because it may not be feasible to recompile large portions of code as unoptimized According to an embodiment, analyzing the core dump of an optimized executable file is accomplished by reconstructing the information about symbol types found in the executable. Type information describes the entire declaration of a symbol. For example, for a declaration like "int *a[10]", "*a", "*a[5]" or just "a" itself can all produce meaningful data. Reconstruction of this information is possible by parsing declarations in the original source code. After parsing, symbols extracted from the core are matched with their corresponding type details. For each symbol, an entry is added to a types table. The type information is combined with the starting address for each symbol in the core and the type's size to extract the values of program variables when the execution of the program was halted. According to an embodiment, an analyzer examines the declaration of the structure and the type information, referring to the header file where the structure defined. Based on this information, type information may be determined by the size of intrinsic data types, for example, the number of bytes for integer, and for character.

After an executable has been compiled and optimized, symbol type information is stripped from the executable. An entry in an optimized executable has an address which points to a data segment within the core file. From just the operating system core file and the optimized executable, it is impossible to gather enough information to reconstruct what caused the failure. After compilation, some information exists about global symbols, such as the symbol name, the address of the data, and its value. However, no information about symbol type and size exist. According to an embodiment, analyzing the core dump of an optimized executable is done by reconstructing information about the types of the symbols found in the optimized executable.

Figure 1:
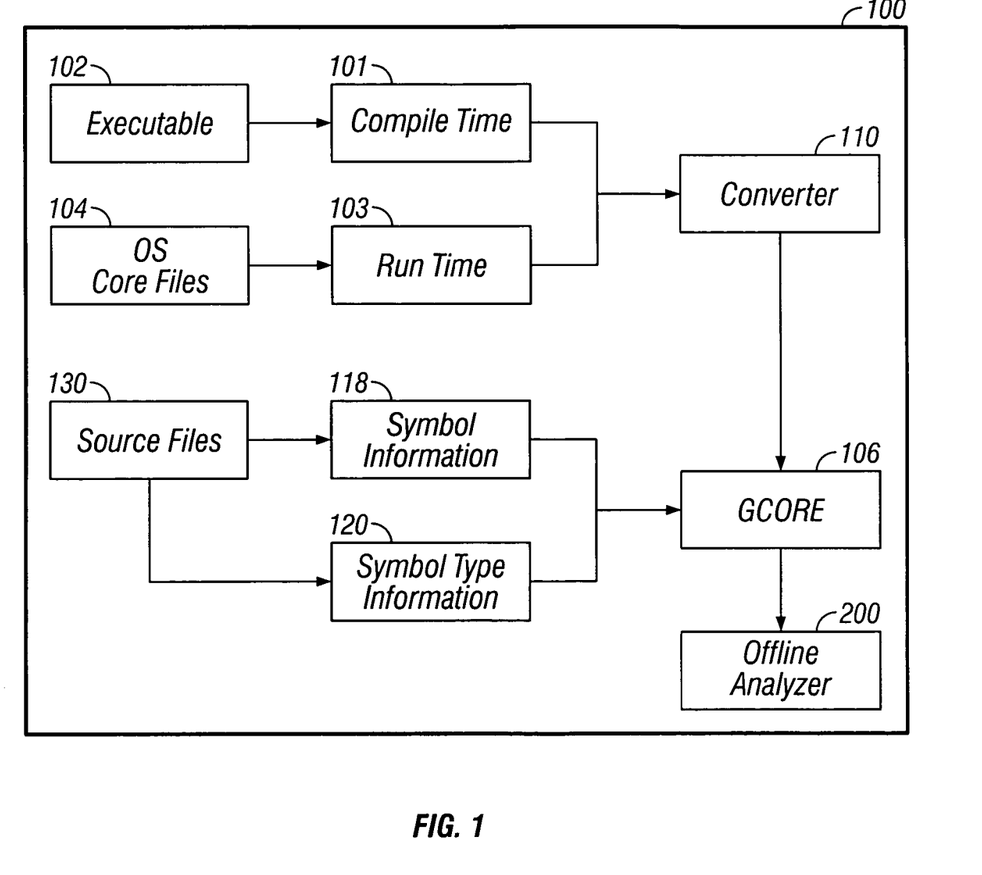
FIG. 1 is a block diagram that depicts a high level overview of a system for optimized program analysis.

FIG. 1 is a block diagram that depicts a high level overview of a system for analysis of optimized executables. According to an embodiment, a system for analysis of a generic representation of an optimized executable core file, such as a GCORE file, is provided.

To create a generic core file for analysis, a converter component 110 is employed to convert data from optimized executable 102 and operating system core file 104. The converter component 110 reads both input files from the executable 102 and operating system core file 104, combines them into a generic format, and establishes initial linkages between these two input files within the GCORE 106. Symbol information 118 and type information 120 extracted from source files 130 is added to GCORE 106. The GCORE 106 is processed by an offline analyzer 200, which provides access to program structures and values that existed at the point of failure. The program structures and values are used in analysis and debugging of this failure.

Figure 2:
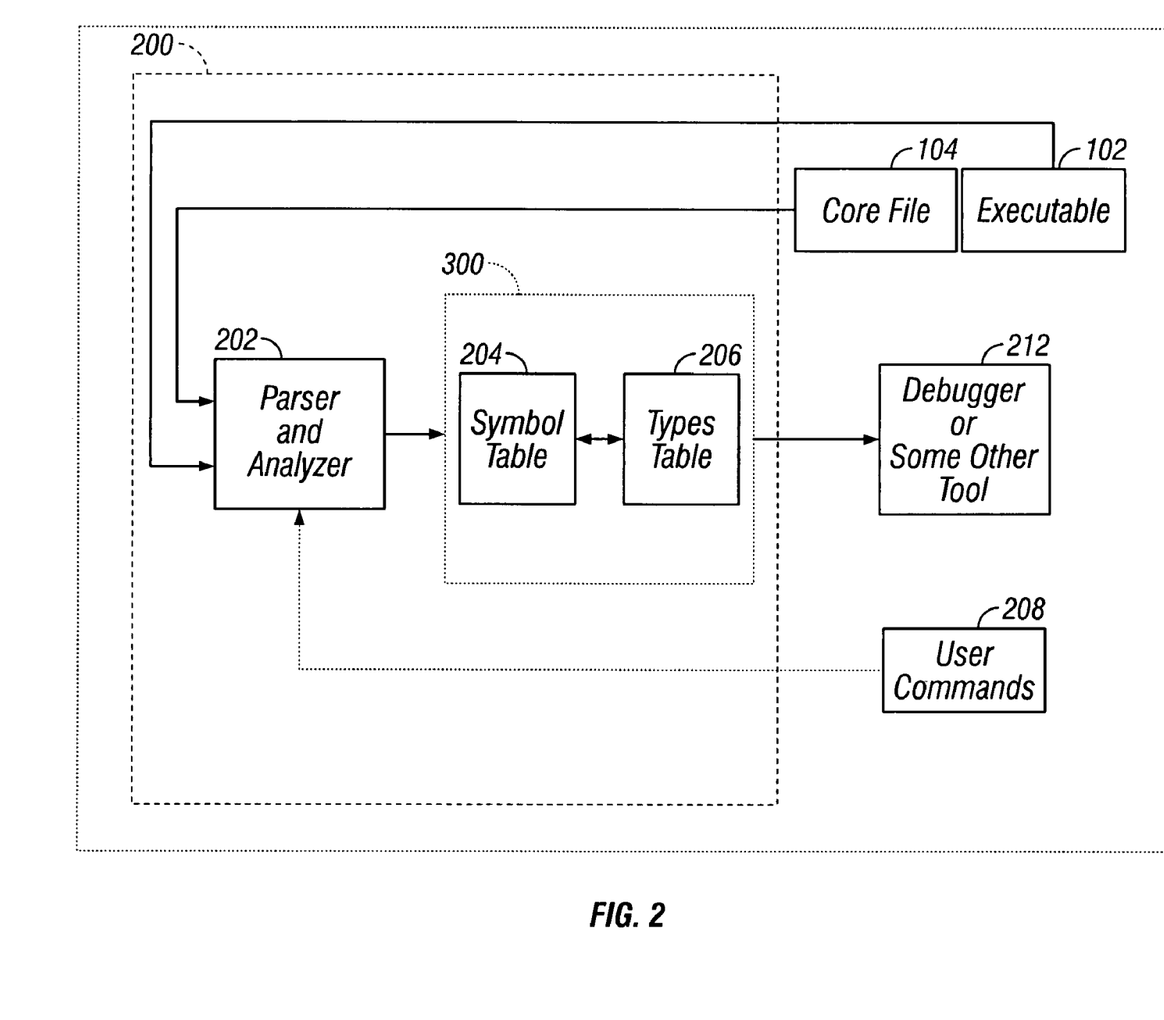
FIG. 2 is a block diagram that depicts an example of a system for optimized program analysis.

According to an embodiment, FIG. 2. depicts details of offline analyzer 200. A parser and analyzer 202 processes information from executable 102, such as global, local, and structure/union members, and information about function parameters. The parser and analyzer 202 processes information from the operating system core file 104, such as virtual addresses and offsets. The parser and analyzer 202 also processes user commands 208, which contain user-defined type definitions which share namespace with global symbols extracted by parsing code declarations for various types and functions. From the processed information, parser and analyzer 202 interprets the processed information and generates an external reconstructed symbol table 204 and a types table 206. The reconstructed symbol and type information can now be made available to third party applications such as a debugger or some other tool 212.

Layout of the Symbol and Type Tables

According to an embodiment, reconstruction of symbol and type information is performed by parsing declarations in source code. Symbols obtained from the operating system core file have corresponding type details. Therefore, for each type there exists an entry in a types table. A starting address for each symbol is available in the basic symbol table available in the executable. From this information, type and size information can be gleaned as well.

Figure 3:
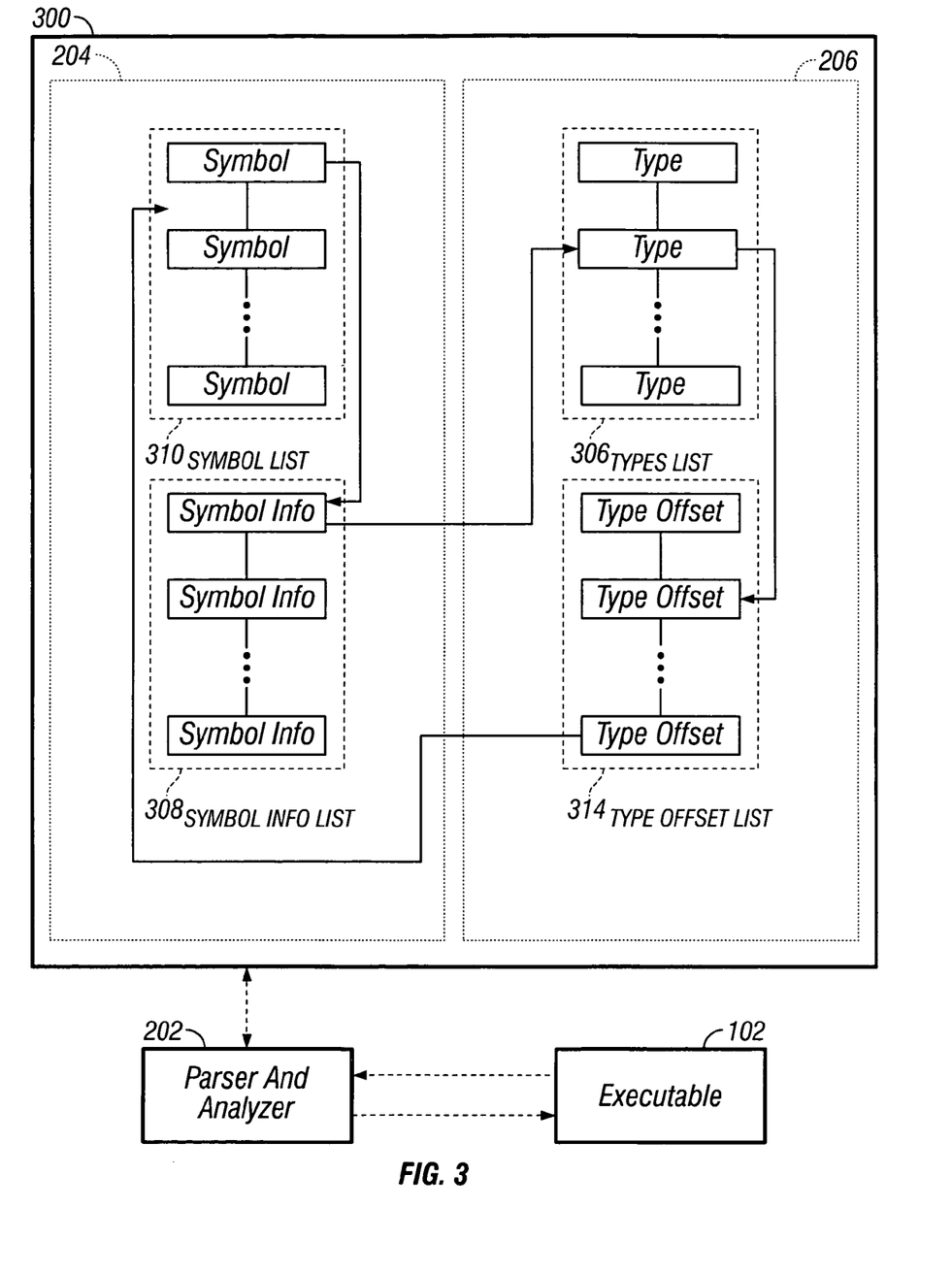
FIG. 3 is a block diagram that depicts an example of a generated symbol and type table for analysis of optimized code in a generic format.

As depicted in FIG. 2, symbol table 204 and types table 206 are generated by the parser and analyzer 112 with entries corresponding to each symbol in the executable 102. FIG. 3 depicts details of symbol table 204 and types table 206 according to an embodiment of the present invention.

According to an embodiment, reconstruction of symbol and type information is depicted through four closely interlinked lists 300. The four closely interlinked lists 300 represent value and parameter details for reconstructing symbol and type information.

Symbol Table

According to an embodiment, symbol table 204 is represented by two distinct lists, symbol list 310 and symbol info list 308. Each entry in symbol list 310 points to an entry in symbol info list 308, which lists symbol type details. Entries in symbol info list 308 each have a pointer which corresponds to an entry in type table 206.

Type Table

The type table 206 is represented by two distinct lists, types list 306 and type offset list 314. There is an entry in type list 306 corresponding to every type in the executable 102. Complex types, such as structures and functions have an additional pointer to a types offset list 314 that lists related elements or parameters. Symbol table 204 has an entry for each type listed in the type offset list 314. Entries in this type offset list 314 refer to an entry in the symbol table 204 that identifies its parent. An identifier, such as a flag, may be used to distinguish a parent symbol from a child symbol. The four closely interlinked lists 300 represent details for reconstructed symbol and type tables as depicted in 204 and 206 respectively.

External creation of the symbol and types information can be an effective solution to the problems that arise because of the optimization of executables after compilation of program source code, such as C programs. The invention eliminates the need for recompiling optimized executables, as it reduces overhead (due to recompilation time) and enables analysts to determine causes of core dumps. Issues, for example, such as those related to memory corruption, disappear once executables are recompiled with debug option. The invention is therefore applicable to any executable. To ensure that the released code performs well, executables are built with the maximum optimization level. Therefore, the invention simplifies analysis of errors encountered in any optimized executable.

Hardware Overview

The approach for analysis of optimized executables described herein may be implemented in a variety of ways and the invention is not limited to any particular implementation. The approach may be implemented as a stand-alone mechanism. Furthermore, the approach may be implemented in computer software, hardware, or a combination thereof.

Figure 4:
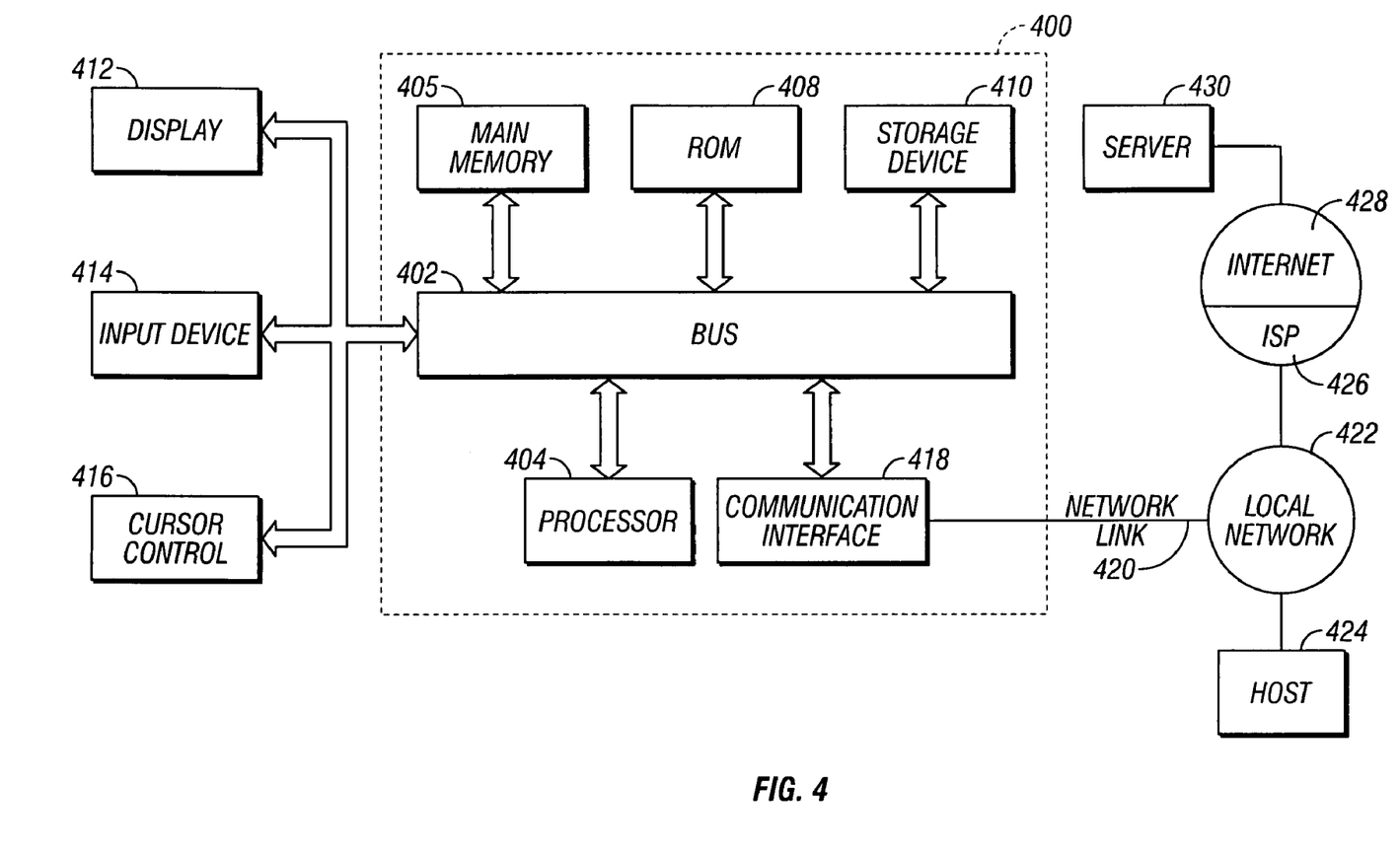
FIG. 4 is a block diagram that depicts a computer system upon which embodiments of the invention may be implemented.

FIG. 4 is a block diagram that depicts a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

Processor 404 may execute the received code as it is received, and/or stored in storage device 410, or other non-volatile storage for later execution. In this manner, computer system 400 may obtain application code in the form of a carrier wave.

Extensions and Alternatives

In the foregoing specification, the invention has been described with reference to specific embodiments thereof. It will, however, be evident that various modifications and changes may be made thereto without departing from the broader spirit and scope of the invention. Thus, the specification and drawings are, accordingly, to be regarded in an illustrative rather than a restrictive sense. The invention includes other contexts and applications in which the mechanisms and processes described herein are available to other mechanisms, methods, programs, and processes.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps. Furthermore, other embodiments may use more or fewer steps than those discussed herein.

What is claimed is:

1. A machine-implemented method, comprising:
   retrieving a core dump that reflects the execution state of a computer program executing at a particular point in time;
   retrieving an executable file that was previously compiled from a set of source files for said computer program, wherein the executable file does not include type information that indicates the type of each symbol of a plurality of symbols that are in the executable file;
   combining the core dump and the executable file and establishing links between the core dump and the executable file to generate a core file;
   analyzing the set of source files to reconstruct the type information that indicates the type of each symbol of the plurality of symbols that are in the executable file;
   adding the type information to the core file that represents the execution state of said computer program.

2. The method of claim 1, wherein the core dump does not contain sufficient information to determine parameter values of a function call that is reflected in the core dump.

3. The method of claim 2, further comprising:
   extracting symbol information from the set of source files used to create the executable file; and
   determining said parameter values of the functional call based on said symbol information and the core file.

4. The method of claim 1, wherein the core dump does not contain sufficient information to determine a value of a particular variable that is reflected in the core dump.

5. The method of claim 4, further comprising:
   extracting symbol information from the set of source files used to create the executable file; and
   determining said value of said particular variable based on said symbol information and the core file.

6. The method of claim 1, wherein a debugger analyzes the core file to determine the state of said computer program at said particular point in time.

7. The method of claim 1, further comprising analyzing the core file to determine the state of said computer program at said particular point in time.

8. The method of claim 7, wherein:
the computer program executes on a first computer; and
a second computer that is different than the first computer and that analyzes the core file has a platform architecture that is different from the platform architecture of the first computer.

9. The method of claim 1, wherein the core file is a platform-independent core file.

10. The method of claim 1, wherein analyzing comprises parsing declarations in the set of source files.

11. A non-transitory machine-readable medium storing instructions, wherein execution of the one or more sequences of instructions by one or more processors causes:
retrieving a core dump that reflects the execution state of a computer program executing at a particular point in time;
retrieving an executable file that was previously compiled from a set of source files for said computer program, wherein the executable file does not include type information that indicates the type of each symbol of a plurality of symbols that are in the executable file;
combining the core dump and the executable file and establishing links between the core dump and the executable file to generate a core file;
analyzing the set of source files to reconstruct the type information that indicates the type of each symbol of the plurality of symbols that are in the executable file;
adding the type information to the core file that represents the execution state of said computer program.

12. The non-transitory machine-readable medium of claim 11, wherein the core dump does not contain sufficient information to determine parameter values of a function call that is reflected in the core dump.

13. The non-transitory machine-readable medium of claim 12, wherein the instructions, when executed by the one or more processors, further causes:
extracting symbol information from the set of source files used to create the executable file; and
determining said parameter values of the functional call based on said symbol information and the core file.

14. The non-transitory machine-readable medium of claim 11, wherein the core dump does not contain sufficient information to determine a value of a particular variable that is reflected in the core dump.

15. The non-transitory machine-readable medium of claim 14, wherein the instructions, when executed by the one or more processors, further causes:
extracting symbol information from the set of source files used to create the executable file; and
determining said value of said particular variable based on said symbol information and the core file.

16. The non-transitory machine-readable medium of claim 11, wherein the instructions include instructions for a debugger that analyzes the core file to determine the state of said computer program at said particular point in time.

17. The non-transitory machine-readable medium of claim 11, wherein the instructions, when executed by the one or more processors, further cause analyzing the core file to determine the state of said computer program at said particular point in time.

18. The non-transitory machine-readable medium of claim 17, wherein:
the computer program executes on a first computer; and
a second computer that is different than the first computer and that analyzes the core file has a platform architecture that is different from the platform architecture of the first computer.

19. The non-transitory machine-readable medium of claim 11, wherein the core file is a platform-independent core file.

20. The non-transitory machine-readable medium of claim 11, wherein analyzing comprises parsing declarations in the set of source files.

* * * * *

UNITED STATES PATENT AND TRADEMARK OFFICE
CERTIFICATE OF CORRECTION

| | | |
|---|---|---|
| PATENT NO. | : 8,156,478 B2 | Page 1 of 1 |
| APPLICATION NO. | : 11/508576 | |
| DATED | : April 10, 2012 | |
| INVENTOR(S) | : Sethi et al. | |

It is certified that error appears in the above-identified patent and that said Letters Patent is hereby corrected as shown below:

In the Specifications:

In column 4, line 2, delete "registers" and insert -- registers. --, therefor.

In column 4, line 3, delete "failure" and insert -- failure. --, therefor.

In column 4, line 15, delete "unoptimized" and insert -- unoptimized. --, therefor.

In column 4, line 66, delete "2." and insert -- 2 --, therefor.

Signed and Sealed this
Seventeenth Day of July, 2012

David J. Kappos
*Director of the United States Patent and Trademark Office*